(12) United States Patent
Jerez (10) Patent No.: US 6,247,539 B1
(45) Date of Patent: Jun. 19, 2001

(54) CULTIVATOR IMPLEMENT WITH CASTELLATED CULTIVATING PROTRUSIONS AND MULTI-IMPLEMENT, POWERED, CULTIVATION SYSTEM

(76) Inventor: Orlando Jerez, 3333 Delaware St., Kenner, LA (US) 70065

( * ) Notice: Subject to any disclaimer, the term of this patent is extended or adjusted under 35 U.S.C. 154(b) by 0 days.

(21) Appl. No.: 09/246,039

(22) Filed: Feb. 5, 1999

(51) Int. Cl.⁷ .................................................. A01D 34/68
(52) U.S. Cl. .......................... 172/41; 172/123; 172/136; 30/DIG. 7; 56/12.7; 56/234; 56/249.5; 56/251; 56/255; 56/256; 56/294; 56/295
(58) Field of Search ................................. 172/41, 15, 13, 172/123, 136; 30/DIG. 7, DIG. 5, 347, 357, 355, 276; 56/12.7, 233, 234, 235, 249, 249.5, 251, 255, 256, 294, 295

(56) References Cited

U.S. PATENT DOCUMENTS

| | | |
|---|---|---|
| 1,610,161 | 12/1926 | Russell . |
| 2,574,237 | 11/1951 | Barrow . |
| 2,886,716 | 5/1959 | Camp . |
| 2,968,903 | 1/1961 | Kesling . |
| 2,991,838 | 7/1961 | Lane ..................... 175/221 |
| 3,129,771 | 4/1964 | Lidstone ................. 172/25 |
| 3,807,151 | 4/1974 | Rosenthal et al. ..................... 56/16.9 |
| 4,242,794 | 1/1981 | Peterson ........................... 56/12.7 X |
| 4,286,675 | 9/1981 | Tuggle ............................. 56/12.7 X |
| 4,293,041 | 10/1981 | Holmstadt et al. ................... 172/39 |
| 4,295,324 | 10/1981 | Frantello et al. ..................... 56/12.7 |
| 4,374,465 | 2/1983 | Comer .................. 56/12.7 |
| 4,382,356 | 5/1983 | Ballas, Sr. et al. .................. 56/12.7 |
| 4,501,332 | 2/1985 | Straayer ................. 172/41 |
| 4,513,563 | 4/1985 | Roser et al. ........................ 56/12.7 X |
| 4,819,416 | 4/1989 | Jones ..................... 56/12.7 |
| 4,832,131 | 5/1989 | Powell et al. ........................... 172/25 |
| 4,856,194 | 8/1989 | Lee ................... 56/12.7 X |
| 4,862,682 | 9/1989 | Wait et al. ............................ 56/255 |
| 4,890,389 | 1/1990 | Whitkop ................. 30/276 |
| 4,911,247 | 3/1990 | Kuhlmann et al. ..................... 172/41 |
| 4,936,884 | 6/1990 | Campbell ............................. 56/12.7 |
| 4,962,630 | 10/1990 | Jones .................... 56/12.7 |
| 5,048,187 | 9/1991 | Ryan ..................... 30/276 |
| 5,144,748 | 9/1992 | Hult ................. 56/12.7 X |
| 5,271,212 | 12/1993 | Anderson ............................. 56/12.7 |
| 5,345,788 | * 9/1994 | Jerry ...................... 56/255 |

(List continued on next page.)

Primary Examiner—Christopher J. Novosad
(74) Attorney, Agent, or Firm—C. Emmett Pugh; Pugh/Associates, Patent & Trademark Attorneys (57) ABSTRACT

Implements for attaching to a hand-held, powered "Weed-Eater" type device to perform various work or chores (filament cutting, blade cutting, brushing, blowing, mixing, etc.). After disconnecting the device's original implement typically a spool of filament (6) with a bumper feed (7), an initial, cultivator/cutter implement (10), cylindrical in shape with a substantially solid, circular top (12) and a relatively thin, continuous wall of constant thickness, is attached by an appropriate threaded member (e.g. a nut or bolt, usually with one or more washers) to the bottom end of the powered device (FIGS. 1A–D) through a central opening (13). The cultivator's top includes a series of circumferentially spaced, "snap-in" openings (14; e.g. two or more) through and into which other implements (e.g. those of FIGS. 3–20) can be attached (FIGS. 2A & B) with the use of a like number of upwardly extending, "snap" legs (21*a* & *b*), the adapter then functioning as a "universal" adapter for changing in and out various work implements as desired by the user, with a quick and easy removal and addition of an implement with "snap-out"/"snap-in," twist actions. The cultivator/adaptor also includes a series of circumferentially spaced, inwardly offset protrusions (16) extending down from the circular side wall bottom (15), which protrusions dig into and cultivate the ground, removing undesirable vegetation when rotated by the powered device. Side hole sets (17) are provided for adding cutting filament sections (18) for supplemental or alternative filament cutting.

9 Claims, 10 Drawing Sheets

U.S. PATENT DOCUMENTS

| | | | |
|---|---|---|---|
| 5,361,570 | * 11/1994 | Bernardy | 56/255 |
| 5,426,852 | 6/1995 | Macomber | 172/41 |
| 5,430,943 | 7/1995 | Lee | 56/295 X |
| 5,491,963 | 2/1996 | Jerez | 56/17.1 |
| 5,493,783 | 2/1996 | Oostendorp | 56/12.7 X |
| 5,615,543 | 4/1997 | Caffey et al. | 56/295 |
| 5,617,636 | 4/1997 | Taggett et al. | 56/12.7 X |
| 5,622,035 | 4/1997 | Kondo et al. | 56/12.7 |
| 5,651,418 | 7/1997 | Jerez | 172/14 |
| 5,722,172 | 3/1998 | Walden | 56/255 X |
| 5,761,892 | * 6/1998 | Quiroga | 56/255 X |
| 6,038,842 | * 3/2000 | Quiroga | 56/255 X |

* cited by examiner

CULTIVATOR IMPLEMENT WITH CASTELLATED CULTIVATING PROTRUSIONS AND MULTI-IMPLEMENT, POWERED, CULTIVATION SYSTEM

RELATED PATENTS

This application relates to some of the same subject matter as the inventor's prior U.S. Pat. No. 5,491,963, issued Feb. 20, 1996, entitled "Garden Cleaning Implement for Cutting/Macerating Weeds Above & Below the Ground," and U.S. Pat. 5,651,418, issued Jul. 29, 1997, entitled "Convertible, User-Supported, Garden Cleaning Implement For Cutting/Macerating Weeds and Like," the disclosures of which are incorporated herein by reference.

TECHNICAL FIELD

The present invention relates to a two-hands-held, powered tool with a very long handle for doing various chores, mostly garden-related, generally characterized as a "Weed-Eater" type of device. In one aspect of the present invention, it is initially directed in particular to a basic, unique garden cultivator implement for such a device and also preferably to one which includes supplemental means for doing filament line cutting as well. The present invention further relates to a powered, user-two-hand-held, long handle, garden cleaning device or unit which is used to remove weeds and the like out of, for example, a garden, and more particularly to such a garden cleaning implement which has a relatively rigid, rotating member allowing for protective cutting of, for example, weeds and the like immediately adjacent to, for example, desirable vegetation without damaging the vegetation, while also allowing the cultivator implement to be lowered down into the ground for cultivating the soil and macerating the weed roots. The invention is further directed to a sub-system which includes a "universal" attachment or adapter interface by which a number of different work implements can be easily and quickly attached to the "Weed-Eater" type, powered tool for doing different types of work, depending on the particular implement the user attaches to the powered tool. The invention is further directed to various, unique implements for use on a hand-held, powered device of the "Weed-Eater" type to do different types of work.

BACKGROUND ART

The following is a list of patents which may be of interest for general background information:

| Patent No. | Inventor(s) | Issue Date |
|---|---|---|
| 3,129,771 | Lidstone | 21 Apr 1964 |
| 4,242,794 | Peterson | 06 Jan 1981 |
| 4,286,675 | Tuggle | 01 Sep 1981 |
| 4,501,332 | Straayer | 26 Feb 1985 |
| 4,856,194 | Lee | 15 Aug 1989 |
| 4,862,682 | Wait et al | 05 Sep 1989 |
| 5,426,852 | Macomber | 27 Jun 1995 |
| 5,430,943 | Lee | 11 Jul 1995 |
| 5,491,963 | Jerez | 20 Feb 1996 |
| 5,493,783 | Oostendorp | 27 Feb 1996 |
| 5,615,543 | Caffey, et al | 01 Apr 1997 |
| 5,617,636 | Taggett, et al | 08 Apr 1997 |
| 5,622,035 | Kondo, et al | 22 Apr 1997 |
| 5,651,418 | Jerez | 29 Jul 1997 |
| 5,722,172 | Walden | 03 Mar 1998 |

With respect to exemplary, two-hands-held, powered tools with extended handles to which cutters, cultivators or other work implements are attached, note, for example, the prior '418 & '963 patents of the inventor hereof (Jerez), as well the '794 (Peterson), the '852 (Macomber), the '783 (Oostendorp), the Wait et al ('682), the Straayer ('332), and the '636 (Taggert) patents, etc. It is further noted that the Lidstone '771 patent, directed to a relatively small, single-hand-held, power drill adaptation, is not from the art to which the present invention applies, namely, the long-handle, two-hands-held, gardening power tool art exemplified by the "Weed-Eater" type of device, although, it is noted for general background purposes, that the Lidstone patent does include a very different cultivator device in comparison to the cultivator implement of the present invention.

With respect to the broad concept of having a long-handle, two-hands-held, powered garden tool system which includes a number of differing work implements, note, for example, the '675 Tuggle patent. With respect to cultivator implements for long-handle, two-hands-held, gardening power tool devices of the general "Weed-Eater" type of device, note, among others, the patents to Straayer ('332) and Wait et al ('682), with the former having a circular type body in the form of a conical section with a continuous, uninterrupted, circular bottom edge.

For an example of a blower attachment, see the '794 (Peterson) patent. With respect to a cylindrically or conically shaped implement with a central opening or bore for attaching the implement to the threaded drive pin of a conventional line trimmer with a nut or bolt and with the former having holes in very thick side wall portions for inserting filament line segments but with the enlarged, side-wall "gussets" inhibiting its use as a cultivator, and the latter being a circular cultivator, note the '543 Caffey, et al and the '332 Straayer patent. The other cited patents includes examples of other types of exemplary attachments or work implements.

However, in this relatively "crowded" art, there are substantial, innovative, "unobvious" differences between the present invention and the prior art, as brought out more fully below. It is believed that the present invention represents an innovative, substantial advance in the prior art and a valuable contribution to the "useful arts."

GENERAL SUMMARY DISCUSSION OF INVENTION

It is thus an object of the invention to provide a two-hand-held, long handle, powered unit for gardening use with an improved cultivator implement and preferably with an improved, combined cultivator/cutter implement, particularly one in which the cultivator can be safely used as a cultivator next to desired vegetation without damaging that vegetation.

It is a further object to provide an adapter for quickly and easily adding a multiple number of different work implements and changing one for another, using, for example, a preferred, "snap-in" and twist type sub-system.

It is still a further object of the present invention to achieve both of the foregoing objects in a combined structure, including preferably both the cultivator/cutter potential functions and the adapter function into a single structure.

It is a final set of objects to provide additional improved implements that allow, for example, the conversion of a standard type, line filament grass/weed cutter of the general "Weed-Eater" type, into a general work, multi-use tool, while still allowing it to be quickly and easily converted back to a gardening type tool or unit.

Thus, in the preferred, exemplary embodiment of the present invention, a combined cultivator/cutter implement of the invention is attachable to different ones of exemplary types of prior art, two-hand-held, long handle, powered devices designed for gardening use using an exemplary, connection sub-system, including a female-threaded-member (e.g. a nut or female threaded end), a male threaded-member (e.g. bolt or male threaded end) and washer combination, varying in its details for different ones of the two-hand-held powered devices. The preferred cultivator implement preferably includes an at least generally cylindrical body with a curved side wall and a series of downwardly extending, circumferentially spaced, preferably inwardly offset and tapered protrusions extending down from the bottom of the cultivator's cylindrical side walls.

When the implement is rotated by the powered unit the protrusions serve to dig into the ground, cultivating it and digging up and macerating any weeds and like undesirable vegetation, while not significantly damaging, if any damage at all, to adjacent vegetation or plants due to their only being a smoothly curved, sidewall contact with the desired vegetation. The cultivator implement preferably also includes a circumferentially spaced set of filament holes into which filament segments can be added with their two ends extending out from each hole set, allowing the cultivator implement to be used as a supplemental or concurrent "Weed-Eater" filament type cutter.

This initial cultivator/cutter implement further preferably includes "snap-in" type opening for attaching other work implements to the "Weed-Eater" type, powered device via the cultivator/cutter element then serving as a "universal" adapter.

The cultivator/cutter implement thus is also used as a "snap-in" attachment adapter for, for example, at least two, exemplary types of implements—a larger, cylindrically concentric one with multiple "snap" legs, and a smaller, circular, ring or disc-shaped one with multiple "snap" legs, respectively, which represent two, exemplary approaches to general implement design for use in the multi-implement system aspect of the present invention.

Thus, with the foregoing approach, one or more, preferably many, different implements can be quickly and easily attached to a "Weed-Eater" type of powered device, preferably without tools, in which selected ones of the implements can be used to perform various types of work or chores (filament cutting, blade cutting, edge blade cutting, brushing, blowing, mixing, etc.).

For example, an initial, circular, cultivator/cutter implement, preferably cylindrical in shape with a substantially solid, circular top, can be attached by an appropriate threaded member (e.g. a nut or bolt, usually with one or more washers) to the bottom end of the long handle powered device. The cultivator/cutter implement preferably includes at its top a series of circumferentially spaced, "snap-in" openings (e.g. two or more) through and into which the other work implements can be selectively attached through the use of the selected implement having a like positioned and number of upwardly extending, "snap" legs at the top of the add-on implement(s).

When that implement's work is completed, it can be easily detached by unsnapping the legs from the adapter and removing it from the powered unit to be easily replaced with one of the other, then selected work implements, and so on.

Of course, other types of quick and easy, mechanical or mechanical/magnetic attachment sub-systems besides the preferred "snap-in" twist design could be used, if so desired, such as, for further example, am insert and counter twist (or rotate) type connection, with a threaded engagement or not, etc.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODES FOR CARRYING OUT THE INVENTION

Various types of two-hand-held, long handle, powered devices, typically for yard or gardening work are well known, a number of which are of the "Weed-Eater" type. A "Weed-Eater" type of device typically uses a rotating spool of filament at its bottom with a feed bumper (note spool 6 and bumper 7 of FIGS. 21A & B) for cutting grass and the like with the end portions of the filament line, as the spool is rotated about a "vertical" axis.

The lengths of the handles of these types of powered devices typically are of the order of a number of feet, typically at least about four to six (4–6') feet. As can be seen in FIGS. 1A–D, the bottom ends 2a–2d of these types of devices 1a–1d typically include powered, rotatable, end threaded members, either of the male or female type, for attaching, for example, the filament spool or other implement that came with the original, powered device.

Figures 1, 1A, 1B:
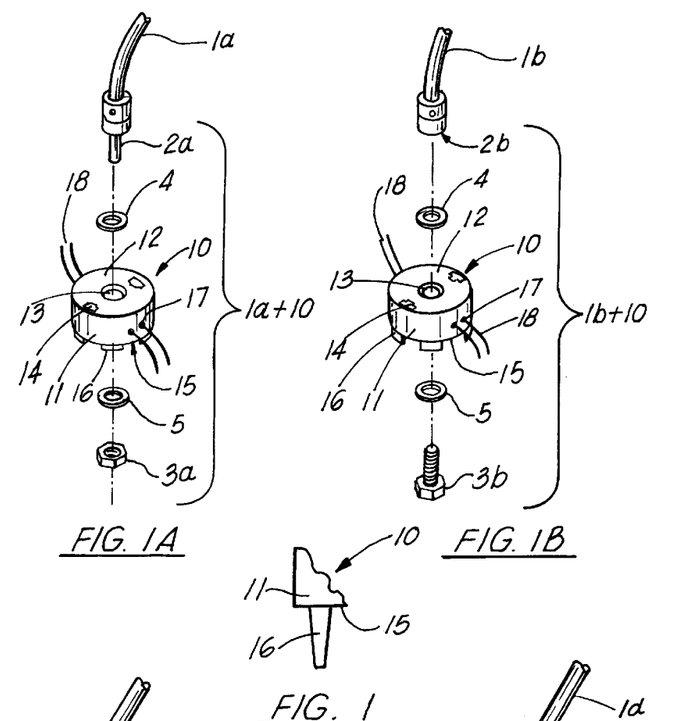
FIG. 1A–D are perspective, exploded views showing a preferred, exemplary embodiment of a combined cultivator/cutter of the invention being attached to different ones of exemplary types of prior art, hand-held powered devices with an exemplary connection sub-system, including a female-threaded-member (e.g. a nut or female threaded end), a male threaded-member (e.g. bolt or male threaded end) and washer combination, varying in its details for different ones of the hand-held powered devices, a different one of the exemplary powered, hand-held devices being shown in each figure, it being further noted that the cultivator/cutter further includes "snap-in" opening for attaching other work implements to the hand-held powered device via the cultivator/cutter element.
FIG. 1 is a partial, close-up, cut-away, side view of one of the tines or protrusions of the embodiment of the combined cultivator/cutter of FIGS. 1A–1D.
Figure 1C:
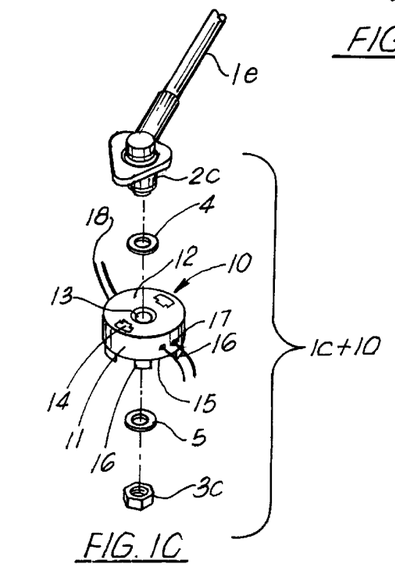
Figure 1D:
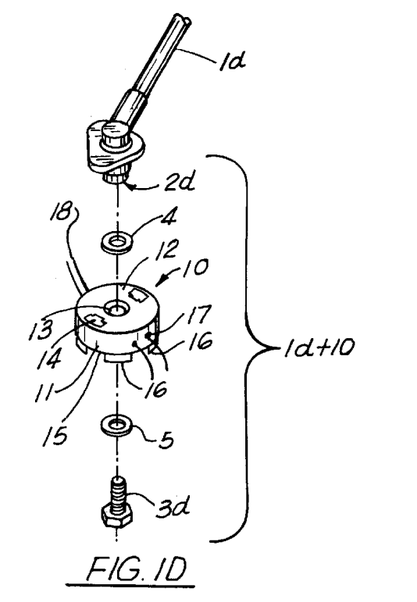
Figure 2A:
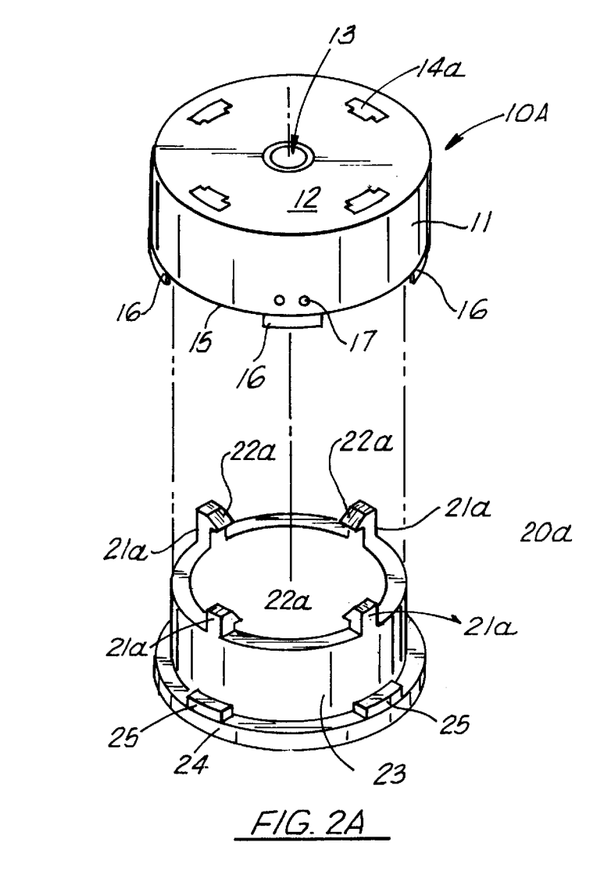
FIG. 2A & 2B are perspective, exploded views of the cultivator/cutter element of FIGS. 1A–D being used as the "snap-in" attachment element for two, exemplary types of implements, a larger, cylindrically concentric one with an exemplary four "snap" legs and a smaller, disc-shaped one with an exemplary two, upwardly extending, "snap" legs, respectively, which represent two, exemplary approaches to general implement design for use in the multi-implement system of the present invention.
Figure 2B:
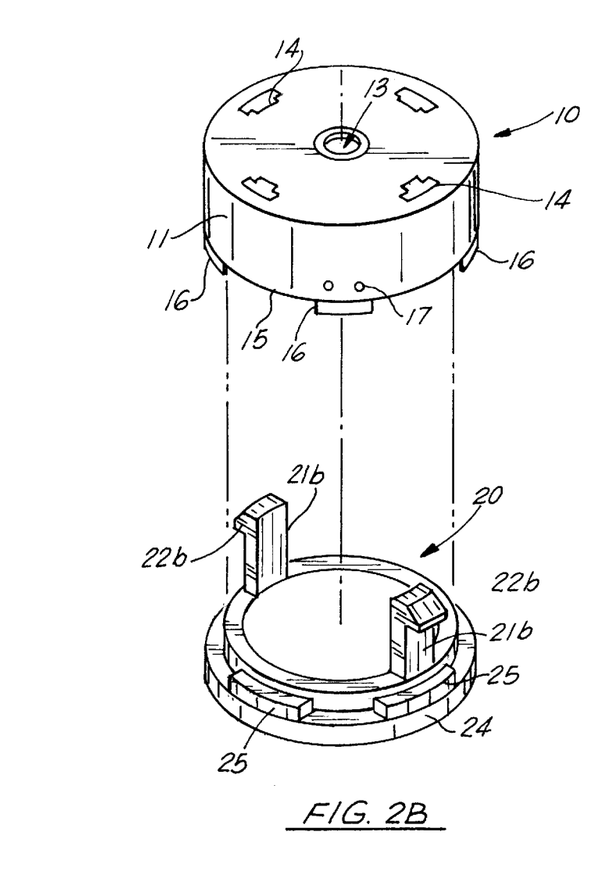

Exemplary Cultivator/Adapter 10 (FIGS. 1 & 2)

In the present invention, any implement [e.g. a filament spool, or other type of implement (e.g. note the various implements shown in the above listed patents), etc.] attached to the bottom end (2a–2d) of the hand-held powered device (1a–1d) is removed. Then, as shown in FIGS. 1A–D, an appropriate threaded member 3a–3d, typically either a nut 3a/3c (FIGS. 1A & 1C) or a bolt 3b/3d (FIGS. 1B & 1D) with one or more appropriate, top and/or bottom washers 4, 5 are used to connect the exemplary cultivator/cutter implement 10 to the long handle, two-hand-held powered device 1a–1d.

As can be seen in FIGS. 1A–D and FIGS. 2A & B, the cultivator/cutter implement 10 includes a cylindrically shaped body 11 with preferably generally a solid top 12 extending over most of its top with, for example, the exception of the central unit attachment opening 13 and the "snap-in," "T" shaped openings 14 circumferentially spaced about the periphery of the top 12. Further open areas could be provided in the top 12, if so desired, as long as the top had the necessary structural integrity and strength. Although the body 11 is preferably exactly cylindrical, some flaring of the side wall may occur, for example, in the manufacturing process which causes the body to be substantially cylindrical, but not exactly cylindrical, in its over-all, exterior shape.

The curved side wall of the body 11 preferably is relatively thin, continuous and of constant thickness, although some deviation of the body's side wall is possible as long as the deviation(s) do not significantly impede the movement and penetration of the side wall down into the ground in the implement's cultivator action and as long as the side wall has the necessary structural integrity and strength. Additionally, peripherally spaced about its bottom 15 are a series of spaced, cultivator extensions tines 16, along with a series of dual opening or hole sets 17 through which the ends of cutting filament line segments 18 are placed for cutting functions. The tines 16 form protrusions having exterior side walls inwardly offset a fraction of an inch from the exterior surface of the side wall (FIG. 1). When it is desired to use the implement 10 as a concurrent or separate filament line cutter, an appropriate number of line segments 18 are placed in the hole sets 17 as seen in FIGS. 1A–D, as further discussed below in detail in connection with FIGS. 24A & B.

Figure 7:
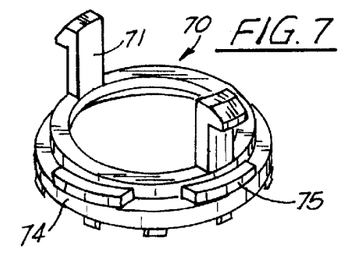
Figure 7A:
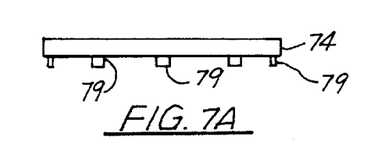

An exemplary number of four (4) protrusions or tines 16, spaced from each at their centers at the circular body's ninety (90°) degree points, are illustrated, but a different number of them, or course, is possible (note for further example the implement 70 of FIG. 7). The protruding tines 16 generally form a "castellated" configuration with the flat, bottom edge 15 and can have inclined side(s) or a taper to aid in their penetration into the ground, however, preferably they are not so sharp as to cut into a human hand when being handled. In cultivator use, the downwardly directed, circumferentially spaced, protruding tines 16 serve to provide spaced, ground entry and macerating projections, which provide a substantially improved cultivator action in comparison to that achieved by a circular cultivator that has only a single, continuous, entry edge extending without interruption about its three hundred and sixty (360) degree scope, such as that shown in the Straayer '332 patent. In the exemplary embodiment 10, the four (4), downwardly protruding tines 16 can have an exemplary width of about an inch and a thickness at their bases of about an eighth (⅛) of an inch, with the body 11 having a diameter of about three and three-quarters (3¾) inches and a constant wall thickness of about a quarter (¼) of an inch.

The cylindrical body 11 with its top 12 and protrusions 16 can be made of an integral body of, for example, molded material, as illustrated. Alternatively, it could be made of two, concentric sections with a castellated metal edge sandwiched between them. A still further, exemplary structure would be an integral, cylindrical body (like 11) with spaced slots in its bottom edge (15), with the projecting tines (16) being formed of, for example, metal inserts which are inserted into the slots.

With respect to the spaced, "snap-in" openings 14, typically a multiple number of them are desirable, for example, the two illustrated in FIGS. 1A–D and 2B. If so desired, however, three or four (14a, as illustrated in FIG. 2A) or more circumferentially spaced ones could be used. Whichever number of "snap-in" openings 14/14a are used, there should be a like number of spaced, upwardly extending, "snap" legs 21a/21b used (note FIGS. 2A & 2B).

Each "snap" leg 21a/21b can have a bit of lateral flex to it, allowing it to slightly bend, if necessary or desired, and, as can be seen in FIGS. 2A & 2B (as well as in FIGS. 3–20), includes at its distal end a laterally extended latch portion 22a/22b. When the exemplary, generalized implement 20/20a is properly aligned with and brought up into engagement with the cultivator/cutter implement 10/10a, the "snap" legs' distal ends with their latch portions 22a/22b are pushed up through the "T" shaped openings 14/14a with the head or top of the legs lined up with the centrally located, radially directed base or stem of the "T" openings, and, after the latch portions pass completely through the central parts of the "T" openings and are rotated or twisted to one side or the other, the legs 21a/21b of the implement 20/20a snap into locking engagement with the side ends of the "T" openings 14/14a and thus to the cultivator/cutting implement 10/10a.

The cultivator/cutting implement 10 then no longer serves as a working implement but rather is now serves as a "universal" adapter for the other implements, e.g., the generalized implements 20/20a of FIGS. 2A & 2B and those of FIGS. 3–20, to be quickly and easily attached to the hand-held powered device (1a–1d) via the "adapter" 10. Of course, although there is economical advantage to having the cultivator/cutter implement 10 and the "adapter" 10 combined into one and the same structure, the adapter could be designed with a "single use" function, namely, merely as an adapter, if so desired, with the cultivator/cutter implement 10 (presumably without the openings 14) then being connected to the powered device (1a–1d) via the then single function adapter.

With respect to the cultivator/cutter implement 10, it can be made of, for example, metal, plastic or high impact nylon, or the like, etc. The cylindrical body can have an exemplary diameter of about three and three-quarters (3¾) inches, an outer wall thickness of about a quarter (¼) of an inch, and a height of about one and three-eighths (1⅜) inches. The central opening 13 can have a diameter of about a quarter (¼) of an inch, preferably with at least one depression or a series of concentric depressions surrounding it to accept at least one standard size washer or varying diameter washers 4.

The outer, side surfaces of the cultivator tines 16 preferably are off-set back from the circumference of the outer cylindrical surface of the main body 11 of the implement 10 by, for example, a sixteenth (1/16) of an inch. This off-set reduces, if not prevents, any significant damage to any adjacent plants, walls, and the like, as the tines 16 cut up and macerate the soil in its cultivator function.

Many different implements can be used with the "adapter" 10, and, as previously noted, an exemplary series of them are illustrated in FIGS. 3–20. As shown in FIGS. 2A & 2B, the implements are generally of two types, the first type 20 (FIG. 2B) being smaller in its height and somewhat disc or ring shaped at its bottom portion 24 with relatively long, upwardly extending, "snap" legs 21b, with the $2^{nd}$ type 20a (FIG. 2A) being larger having a ring bottom 24 and a cylindrical main body 23 extending above (as illustrated in FIG. 2A) or below (see FIG. 8) the ring portion 24. For those of the latter type with an upwardly extending cylindrical body 23, its outer diameter is close to but a little bit less than the inner diameter of the "adapter" 10, allowing it to be slipped inside the adapter but with preferably, face-to-face surface engagement between the respective cylindrical bodies, enhancing the locking engagement between the two (10+20) and adding to their combined stability. The ring portions 24 of each have upper projections which contact and interface with the bottom 15 of the "adapter" 10.

It is noted that, in some implements of the types of FIGS. 2A & 2B, the central interior area and/or the bottom are solid and in others the interior area and/or the bottom are open, depending on the work for which the implement is designed.

Multi-Implements (FIGS. 3–20)

Although not exhaustive of the types of implements that could be used with the "adapter" 10, the implements of FIGS. 3–20 certainly illustrate many examples of the many different types of some of the work implements that can be used in connection with the system of the present invention.

Figure 3:
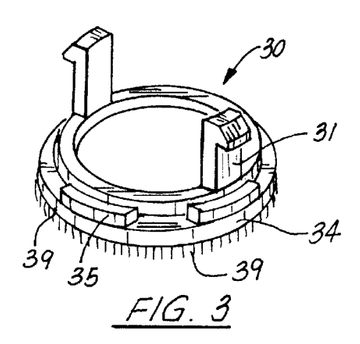
FIGS. 3–20 are perspective views of various exemplary implements with upwardly extending, "snap" legs on them (an exemplary two being illustrated) for attaching to the exemplary cultivator/cutter of FIGS. 1A–2B, with FIGS. 4B–7B being side, partial views of the bottom portions of the implements of FIGS. 4–7, respectively, and FIG. 14A being a bottom view of the implement of FIG. 14 and FIG. 14B being a cross-sectional view taken along section lines B—B of FIG. 14A.

The brush implement 30 of FIG. 3 is of the disc or ring type (somewhat like that of FIG. 2B), with the ring 34 having a closed bottom with series of downwardly directed brush bristles 39 extended about its bottom surface. When attached to the two-hand-held, powered device (1a–1d) via the adapter 10, the brush bristles will be rapidly moved around in circular fashion and can be used for scrubbing, cleaning and other types of brush applications on, for example, a floor or other suitable surface.

It is noted that this implement 30 and some of the following implements have nothing to do with gardening applications and represents the extending out of the application of a "Weed-Eater" type unit to make it a more generalized, powered work tool as well, with a long handle for getting into, for example, out-of-the-way locations and/or while the user is standing up.

Figure 4:
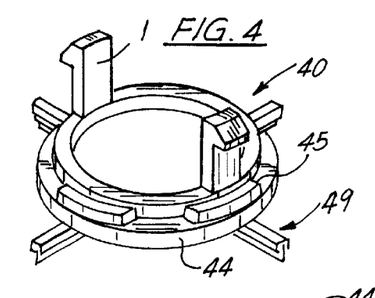
Figure 4A:
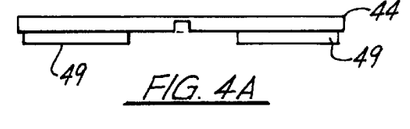

The wiper implement 40 of FIG. 4 is of the disc or ring type (somewhat like that of FIG. 2B), with the ring 44 having a series of downwardly extending wiper blades 49 circumferentially spaced and radially extended along its circular periphery. When attached to the two-hand-held, powered device (1a–1d) via the adapter 10, the wiper blades will be rapidly moved around in circular fashion and can be used to wipe water off a floor or the like and for various other wiper applications.

Figures 5, 5A:
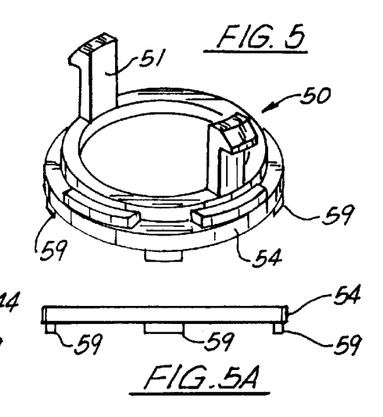

The cultivator implement 50 of FIG. 5 is of the disc or ring type (somewhat like that of FIG. 2B), with the ring 54 having a series of cultivator tines or protrusions 59 downwardly directed and spaced and extended along its circular periphery (similar to tines 16). When attached to the hand-held, powered device (1a–1d) via the adapter 10, the protruding tines 59 will be rapidly moved around in circular fashion and effectively can be used as a replacement for the protruding tines 16 when they wear out, it being noted that the implement 50 substantively duplicates the bottom portion of the body 11 with its tines 16 when "new."

Figure 6:
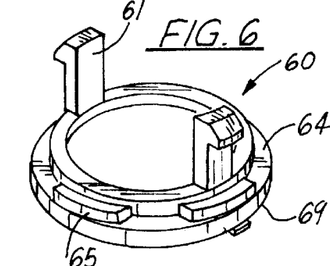
Figure 6A:
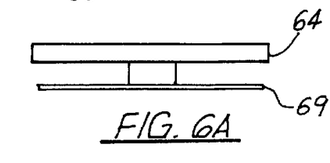

The cutter implement 60 of FIG. 6 is of the disc or ring type (somewhat like that of FIG. 2B), with the ring 64 having a circular or disc shaped, cutting blade 69 with its cutting edge outwardly directed about its periphery with a diameter equal to or less than that of the ring portion 64, thereby protectively exposing its cutting edge within the ring portion's circular periphery. When attached to the two-hand-held, powered device (1a–1d) via the adapter 10, the cutting blade 69 will be rapidly moved around in circular fashion and can be used for various cutting applications, such as, for example, in place of the cutting/macerating type blade (14) shown in the Jerez '963 patent.

The cultivator implement 70 of FIG. 7 is of the disc or ring type (somewhat like that of FIG. 2B), with the ring 74 having a series of downwardly directed, cultivator tines or protrusions 79 downwardly directed and spaced and extended along its circular periphery, in similar fashion to the protrusions or tines 16, but with more tines of narrower width. When attached to the hand-held, powered device (1a–1d) via the adapter 10, the cultivator tines 79 will be rapidly moved around in circular fashion and can be used in similar fashion to the use of the tines 16 on the cultivator/adapter 10. The implement 70 is thus similar to the bottom part of the implement 10, but with a greater number of smaller tines. Like the implement 50, the implement 70 can be effectively used as a tine replacement when the tines 16 wear out on the body 11.

Figure 8:
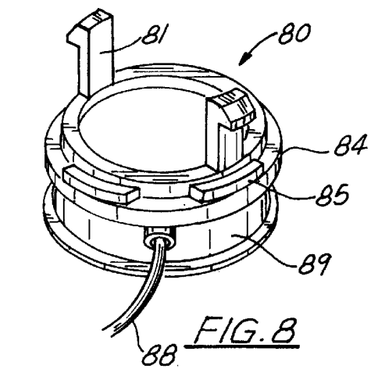
Figure 21A:
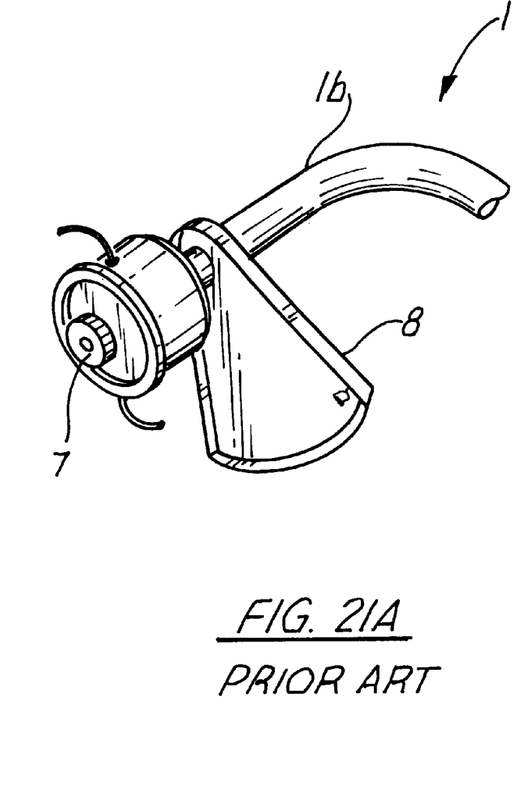
FIG. 21A & B are perspective views of the working end of an exemplary, prior art, hand-held, powered, line filament trimmer unit showing the removal of various standard parts of the unit in preparation for adding the cultivator/cutter/"adapter" of FIGS. 1A–D of the present invention.
Figure 21B:
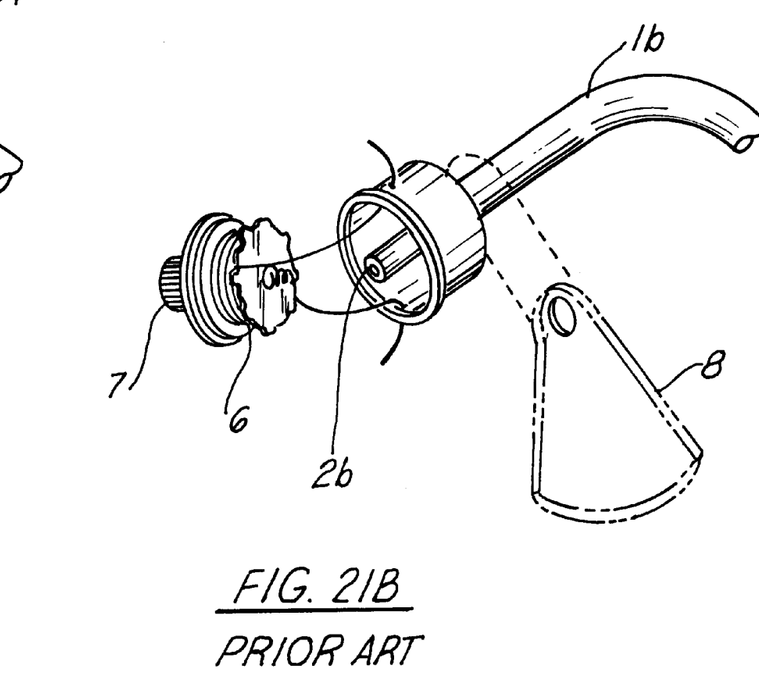

The filament cutter implement 80 of FIG. 8 is of the cylindrical body type (somewhat like that of FIG. 2A, but extended below the ring portion), with the ring 84 having a lower, cylindrical body 89 which houses a line filament spool and has at its bottom a feed bumper (unseen in FIG. 8, but similar to bumper 7 of FIGS. 21A & B). When attached to the two-hand-held, powered device (1a–1d) via the adapter 10, the line spool in the body 89 will be rapidly moved around in circular fashion and serves as a continuous source of cutting line filament 88 in similar fashion to that of the original unit 1 (see, for example, the spool 6 of FIGS. 21A & B). This implement 80 allows for the powered device to be, in effect, converted back to a line spool type of grass/weed cutter in a quick and easy fashion, without the need for any hand tool(s) or the need to remove or re-apply any threaded members.

Figure 9:
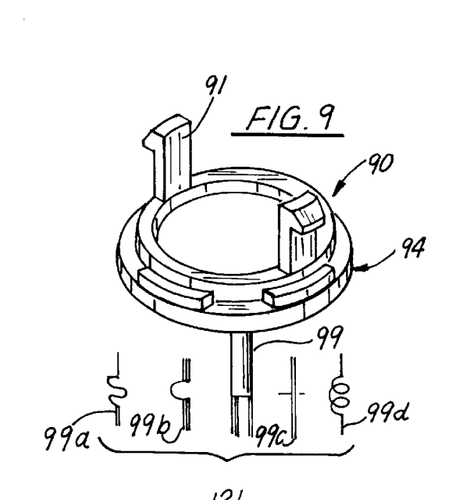

The cultivator implement 90 of FIG. 9 is of the disc or ring type (somewhat like that of FIG. 2B), with the ring 94 having a solid bottom and a solid interior with a centrally located, downwardly extended ground cultivator 99 of a totally different design than the peripherally spaced tines 16. The longitudinally extended, centrally located cultivator 99 can have different shapes, with an exemplary, alternative set of five (5) being illustrated in side-by-side, comparative juxtaposition and referenced as 99a, 99b, 99c & 99d. When attached to the two-hand-held, powered device (1a–1d) via the adapter 10, the cultivator 99 will be rapidly rotated and can be used to chew up the ground or the like, or make holes in the ground to ultimately insert plants in, and for various other cultivator applications.

Figure 10:
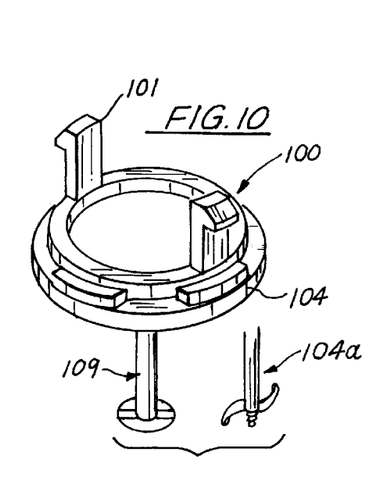

The cultivator implement 100 of FIG. 10 is of the disc or ring type (somewhat like that of FIG. 2B), with the ring 104 having a solid bottom and interior and a centrally located, relatively small, individual weed macerator 109 with an alternative macerator 109a positioned in juxtaposition for comparative purposes. When attached to the two-hand-held, powered device (1a–1d) via the adapter 10, the individual weed macerator 109/109a will be rapidly rotated and, when carefully positioned, can be used to kill and macerate individual weeds and the like and for various other similar applications.

Figure 11:
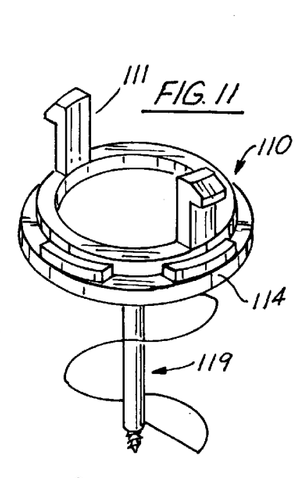

The cultivator implement 110 of FIG. 11 is of the disc or ring type (somewhat like that of FIG. 2B), with the ring 114 having a solid bottom and interior and a centrally located, relatively large, "Archimedes" screw vane 119. When attached to the two-hand-held, powered device (1a–1d) via the adapter 10, the vane 119 will be rapidly rotated and can be used to chew up the ground or the like, or make holes in the ground to ultimately insert plants in, and for various other cultivator applications.

Figure 12:
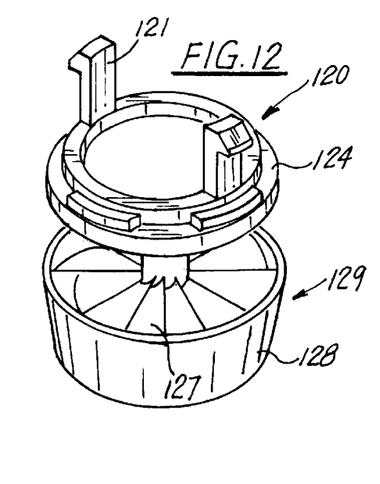

The propeller implement 120 of FIG. 12 is of the disc or ring type (somewhat like that of FIG. 2B), with the ring 124 having an solid bottom and a solid interior and a centrally located, fixed shaft 129 attached thereto and carrying below it a relatively small marine propeller 122 in an attached cowling 123. When attached to the two-hand-held, powered device (1a–1d) via the adapter 10, the shaft 129 and the propeller 122 will be rapidly rotated and can be used as a "kicker" motor for small marine craft and the like.

Figure 13:
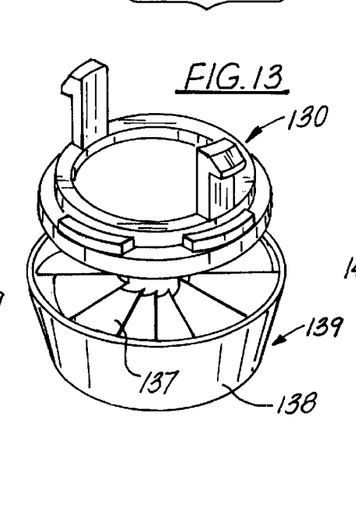

The blower implement 130 of FIG. 13 is of the disc or ring type (somewhat like that of FIG. 2B), with the ring 134 having a solid bottom and a solid interior and a centrally located, fixed shaft 139 attached thereto and carrying below it a fan 132 in an attached cowling 133. When attached to the two-hand-held, powered device (1a–1d) via the adapter 10, the shaft 139 and the fan blades 132 will be rapidly rotated and can be used, for example, as a blower for blowing and moving about grass cuttings, leaves and the like across the ground, sidewalk, driveway, etc.

Figure 14:
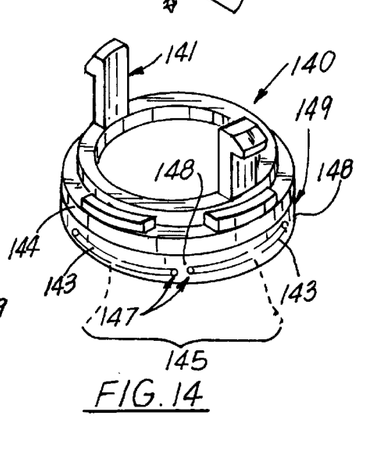
Figure 14A:
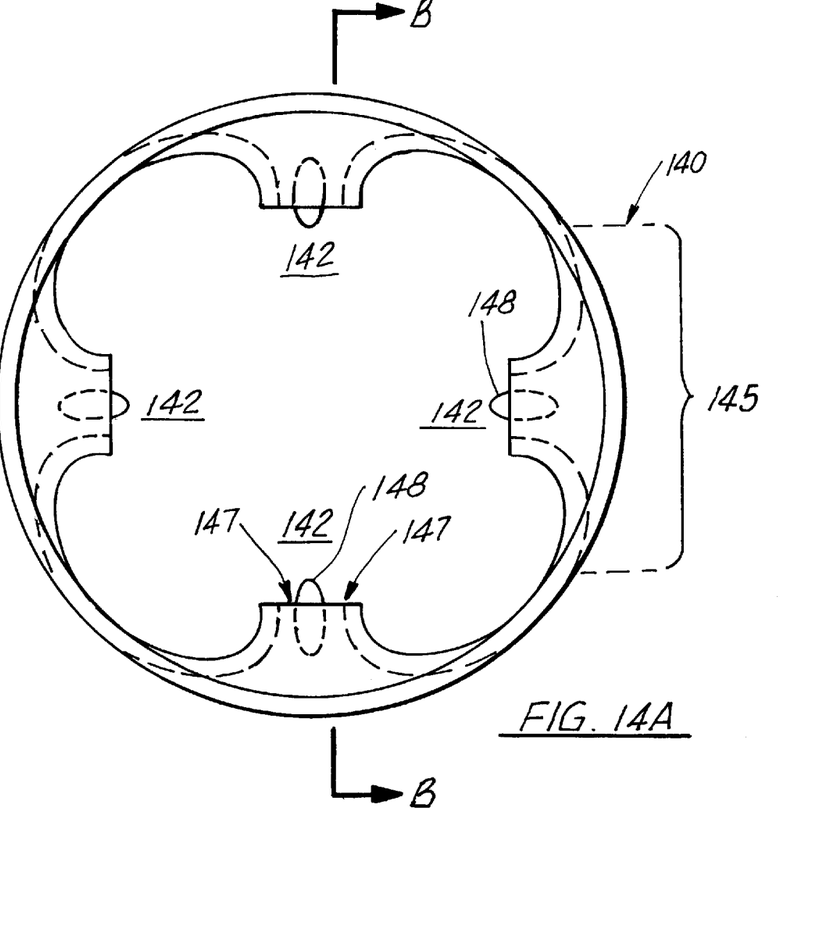
Figure 14B:
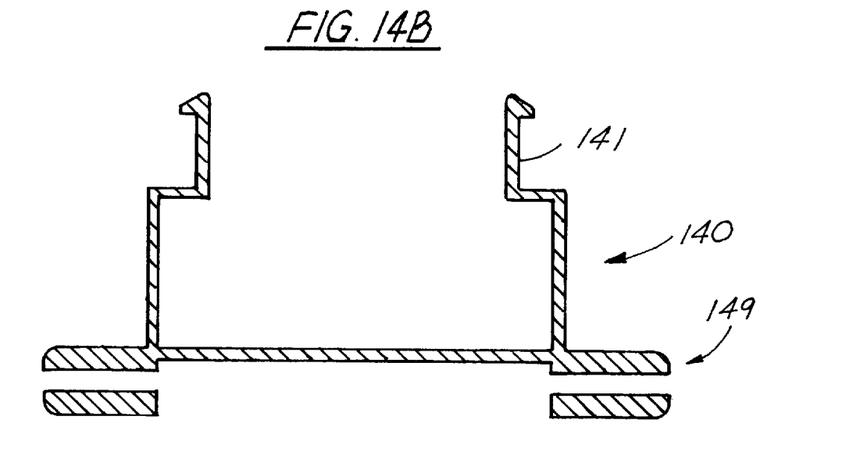

The filament cutter implement 140 of FIGS. 14 and 14A & B is of the disc or ring type (somewhat like that of FIG. 2B), with the ring 144 having a solid bottom and an open interior with cutter filament line placement areas 149 at its bottom portion for use with filament line segments (not illustrated) placed therein and protruding out dual openings 147 at its sides at several (e.g. the four illustrated), equally and circumferentially spaced locations 142. When attached to the two-hand-held, powered device (1a–1d) via the adapter 10, the ring 144 and the filament areas 149 will be rapidly rotated and can be used, for example, as a filament cutter in similar fashion to the filament segments 18 in the holes 17. With respect to the oval, center, line stop member 148, it can be reduced in size, if so desired, so that it can have, for example, the same thickness as the wall thickness and the channel thickness, namely, for example, a quarter (¼) of an inch.

A substantial advantage to the filament cutter design of the cutter implement 140 is that the contact of the filament line segments with the side wall areas of the implement through out that contact is a graduated, curved contact and not a sharp, ninety (90) degree, line contact, as for example, occurs in the openings 17. This all-encompassing curvature of the side wall contact area (note brackets 145) is best seen in FIG. 14A, while the dual, compound curved, side, exterior channels 143 for each filament segment (not illustrated but similar to filament segment 18) is best seen in FIG. 14. However, because of the relatively small scale of FIG. 14, the exterior part of the oval, line holding stop 146 with its curved wall portions can not be well seen but whose curvatures are clearly seen in FIG. 14A.

It is noted that the line segments for the curved openings 147 are inserted and removed in the same general fashion as discussed herein with respect to segments 18 and openings 17. It is noted that, when the implement 140 is spun by the powered device 1a–1d, that part of each line segment that is "up-stream" will fold back over its "down-stream" portion but still will face only curved and not sharp contact with the curved exterior of the stop 146.

Figures 15, 16:
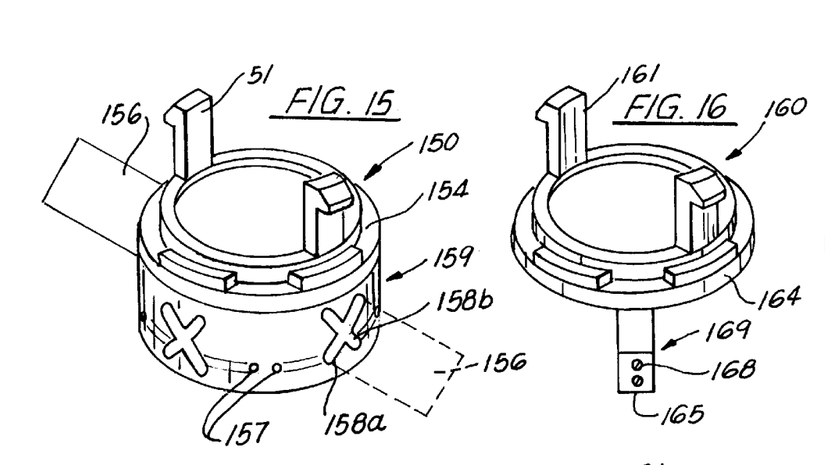

The blower/cutter implement 150 of FIG. 15 is of the cylindrical body type (somewhat like that of FIG. 2A, but extended below the ring portion) with an open bottom and interior, with the ring 154 having a lower, cylindrical body 159 which includes a series of slot sets, a forty-five (45°) degree slot 158a and a mid-intersecting, one hundred and thirty-five (135°), complementary slot 158b. Into these slots 158a or 158b, depending on the direction of rotation of the implement 150, flexible sections of cutting or blower blades 156 are inserted. When attached to the two-hand-held, powered device (1a–1d) via the adapter 10, the blades 156 in the selected set of slots 158a/b will be rapidly moved around in circular fashion and serves as either a cutting blade for vegetation or, more preferably, as blower blades, allowing the implement 150 to be used as a blower to blow and drive cuttings, leaves and other relatively light debris to a desired location or pick-up area.

Additionally, there is also preferably included sets of dual openings 157 at the sides of the cylindrical body 159 at several (e.g. the four illustrated), equally and circumferentially spaced locations, similar in function and design to the openings 147 for the implement 140. When attached to the two-hand-held, powered device (1a–1d) via the adapter 10 and with filament segments (see 18) inserted, the cylindrical body 159, ring 154 and the ends of the filament segments (18) will be rapidly rotated and can be alternatively or concurrently used, for example, as a filament cutter in similar fashion to the filament segments 18 in the holes 17, along with the blower function provided by the blades 156.

The drive implement 160 of FIG. 16 is of the disc or ring type (somewhat like that of FIG. 2B), with the ring 164 having a solid bottom and a solid interior with a centrally located, downwardly extended, connector/drive member 169. The longitudinally extended, centrally located connector/drive member 169 can be used to connect to, for example, the drive shaft of some other device, such as, for example, a small pump (not illustrated but well known in the small pump art) and an exemplary set of screw holes 168 are included for attaching the bottom portion 165 of the member to the other device. When attached to the two-hand-held, powered device (1a–1d) via the adapter 10, the connector/drive member 169 will be rapidly rotated and will rotatably drive the attached device (e.g. a small pump to drain an area or pump water for irrigation, etc.).

Figure 17:
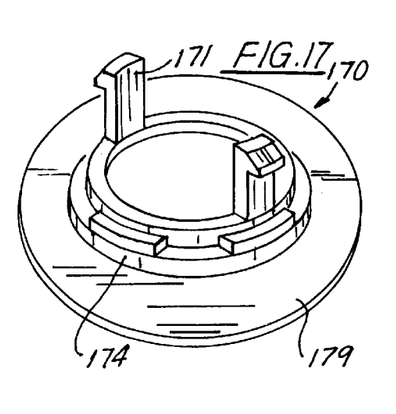

The implement 170 of FIG. 17 is of the disc or ring type (somewhat like that of FIG. 2B), with the ring 174 having a solid bottom and a solid interior with a centrally located, circular, fixed, plate member 179. The radially extended, centrally located plate member 179 can be used, for example, to smooth out the ground. Thus, when attached to the two-hand-held, powered device (1a–1d) via the adapter 10, the plate member 179 will be rapidly rotated and then its smooth bottom surface can be used to, for example, smooth out the cultivated ground after, for example, the cultivator 10 was initially used to break up, dig into and cultivate the ground.

Figure 18:
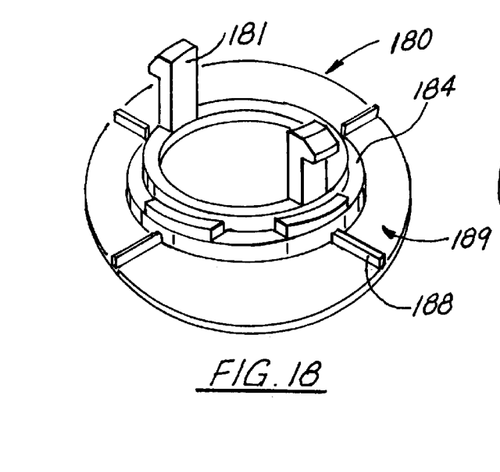

The spreader implement 180 of FIG. 18 likewise is of the disc or ring type (somewhat like that of FIG. 2B), with the ring 184 having a solid bottom and a solid interior with a centrally located, circular, flat, fixed, plate member 189, substantively identical to the plate member 179 of FIG. 17, but with a series of radially and upwardly extended plates 188. The radially extended, centrally located plate member 189 with its radial members 188 can be used, for example, as a spreader implement to distribute, for example, seed, fertilizer, etc., about the ground. Thus, when attached to the two-hand-held, powered device (1a–1d) via the adapter 10, the plate member 189 with its radial members 188 will be rapidly rotated and any seed, fertilizer or other material placed on and falling down onto the upper surface of the plate 189 will then be thrown out and distributed about the ground. A supplemental bin attachment (not illustrated) could be attached to the handle of the device 1a–1d with, for example, a bottom funnel opening extending down to the central or middle portion of the upper side of the plate 189 for feeding the seed, fertilizer or other material unto the upper surface of the plate for distribution about the ground.

Figure 19:
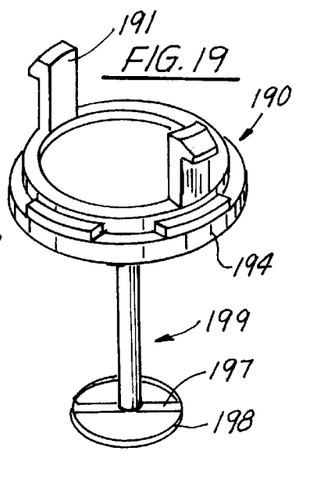

The mixer implement 190 of FIG. 19 is of the disc or ring type (somewhat like that of FIG. 2B), with the ring 194 having a solid bottom and a solid interior with a centrally located, downwardly extended, mixer member 199. The longitudinally extended, centrally located mixer member 199 has a bottom ring 198 which surrounds and supports a mixer blade 197 and can be used to mix various fluent or liquid materials. When attached to the two-hand-held, powered device (1a–1d) via the adapter 10, the mixer member 199 with its mixer blade 197 and ring 198 will be rapidly rotated and can be used to mix together such materials as concrete making materials, etc.

Figure 20:
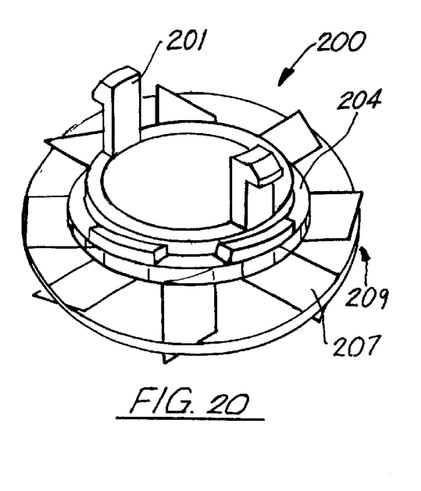

The blower implement 200 of FIG. 20 is of the disc or ring type (somewhat like that of FIG. 2B), with the ring 204 having either a solid bottom and a solid interior or an open bottom and open interior, as may be desired, with a concentrically located, axially extended, blower member 209. The radially extended blower member 209 has an outer ring 208 which surrounds and supports a series of radially extended, angled blower blades 207 and can be used to blow and drive various light materials about, such as, for example, cut vegetation, leaves and other like materials. When attached to the two-hand-held, powered device (1a–1d) via the adapter 10, the blower member 209 with its blower blades 207 and ring 208 will be rapidly rotated and can be used to blow and move various light materials around, e.g., cuttings, leaves and other relatively light debris to a desired location or pick-up area.

The foregoing are exemplary of various tool implements, a number of which are quite innovative, that can be provided with the cultivator/adapter 10 or other adapter for turning a "Weed-Eater" device to a complete work and gardening system. It is noted that each of the implements 3–20 include upwardly extending, "snap" legs 31–201 which are used in similar fashion to the "snap" legs 21a/b of FIGS. 2A & 2B to attach its respective implement to the adapter 10 via the "snap" openings 14a/b.

Gardening Use of Converted Unit (1; 1a–1d)

The present invention is in one of its aspects primarily designed to provide safe removal of unwanted vegetation from, for example, underneath the ground, surrounding delicate flowers and shrubs, as well as plants, as well as many other applications. The cultivator/cutter implement 10 can be used to eliminate unwanted vegetation, especially "hard to get rid of" vegetation, by getting to the source of the problem. Regular use will ensure that unwanted vegetation will not appear anytime soon, leaving a beautiful garden area. This also ensures that the soil will receive the vital nutrients that the unwanted vegetation takes from the desirable plants. The implement 10 is preferably designed to work both as a cultivator, as well as a line trimmer.

The cultivator/cutter or trimmer 10 of the present invention can be used by disassembling a standard line trimmer spool type, powered unit 1 (FIG. 21; see also units 1a–1d of FIG. 1A–1D) by removing, for example, the standard bump 7, spool 6 and spring (not seen in figure) used in such "Weed-Eater" type units. The typical line trimmer unit's guard 8 preferably is also temporarily removed to use the implement 10 or multi-implement system of the present invention.

For curved and straight shaft units 1a–1d, a top washer 4 [which can be, for example a one (1") inch washer] or bushing is used to balance the implement 10. A bottom washer 5 [which can be, for example, a half (½) inch washer] is used along with the either a nut or bolt as appropriate for the powered, hand-held unit. The right size of bolts 3b/3d and nuts 3a/3c, of course, should be used for the particular powered unit 1a–1d involved. It is believed that the cultivator/cutter/"adapter" 10, as described, should fit on approximately ninety-five (95%) percent of all gas trimmers. The bolts 3b/3d or nuts 3a/3c should not be forced, as the threads may be damaged.

In use for garden work, with the cultivator/cutter implement 10 attached to the powered, hand-held device (1a–1d) in a garden, the user can use both hands to start cutting around plants, vegetables, etc. The user can move, for example, backwards, slowing down power of the combined unit (e.g. 1a+10), and moving the combined unit left and right with the implement 10 held in a "flat" position.

The user should avoid contact with desirable plants, but, even if there is contact between the rotating side wall of the cylindrical body 11 of the implement 10, its curvature and the inward off-setting of the cultivator tines 16, often greatly reduce, if not eliminate, any significant damage to such plants, particular where the plant has a reasonably strong trunk or stem.

Figure 22:
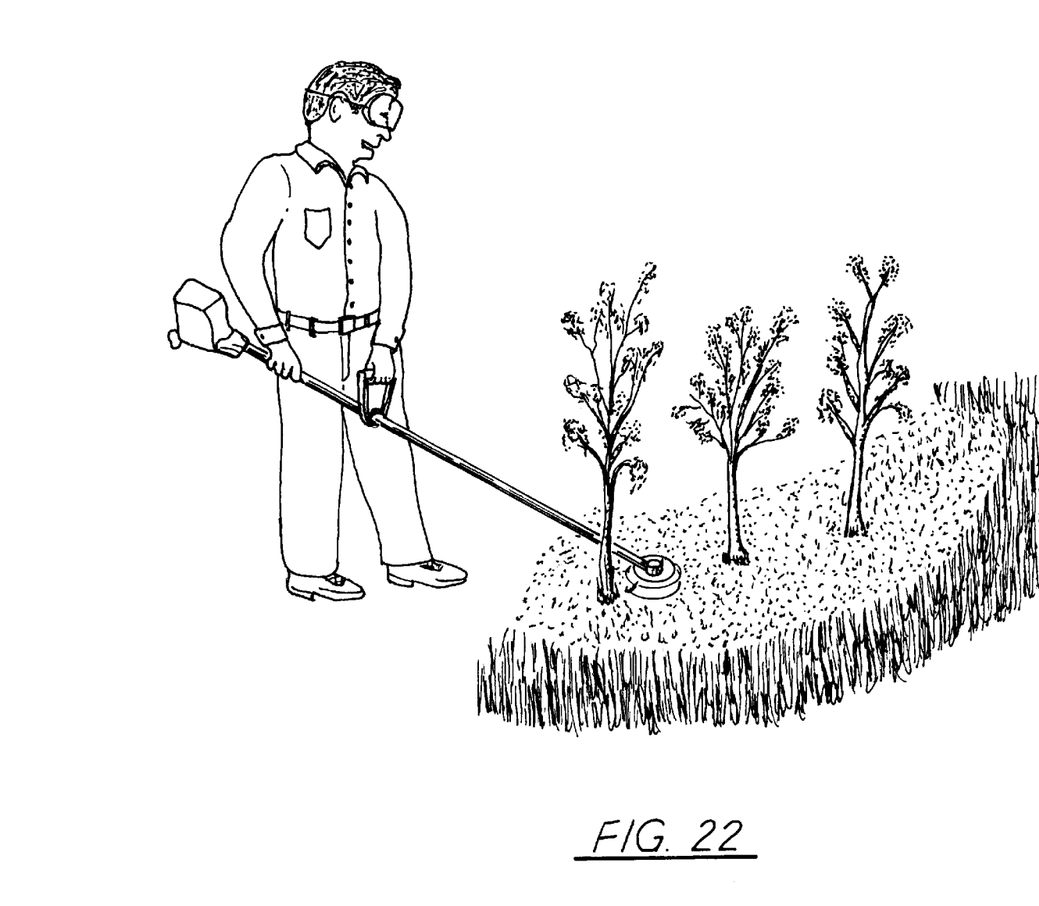
FIG. 22 is a perspective view showing the altered unit of FIG. 21B, with the addition of cultivator/cutter/"adapter" of FIGS. 1A–D added, in use in doing a gardening chore.

When the weeds are too high, the combined unit 1/10 should be set on top of them and the powered unit 1 accelerated gently. Additionally, for best results, the unit should be moved left and right more than once on top of the weeds. (See FIG. 22.)

The combined unit (e.g., 1b+10) should be used, for example, on a weekly basis for, for example, the first three weeks of use. After that period of time, it can be used whenever the user thinks it is necessary. The unit is best used when the ground is dry.

Figure 23A:
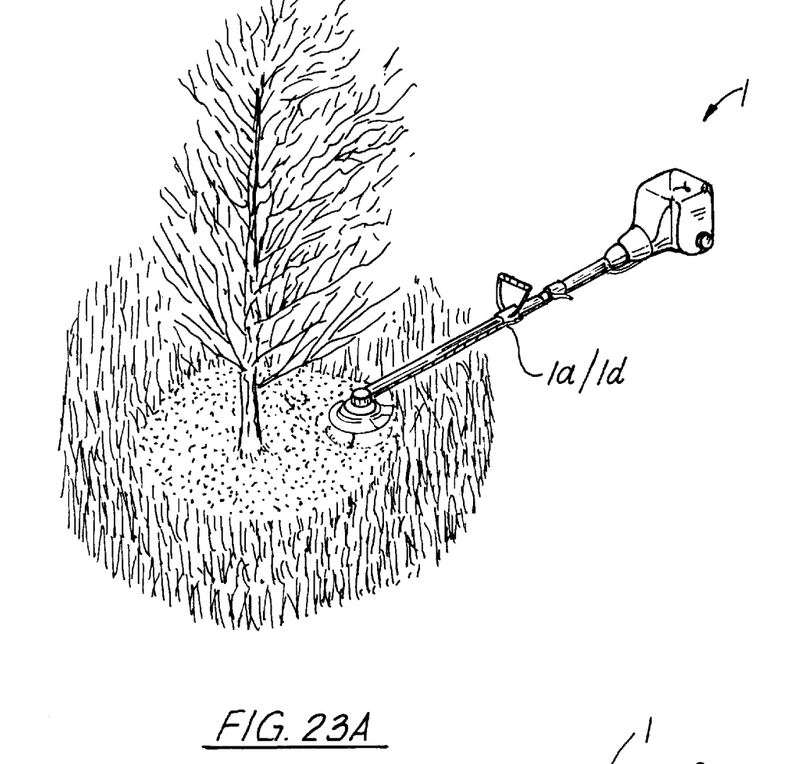
FIGS. 23A & B are perspective views showing the altered unit of FIG. 21B, with the addition of the cultivator/cutter/"adapter" of FIGS. 1A–D added, in use in doing gardening chores, including cultivating and cutting, respectively.
Figure 23B:
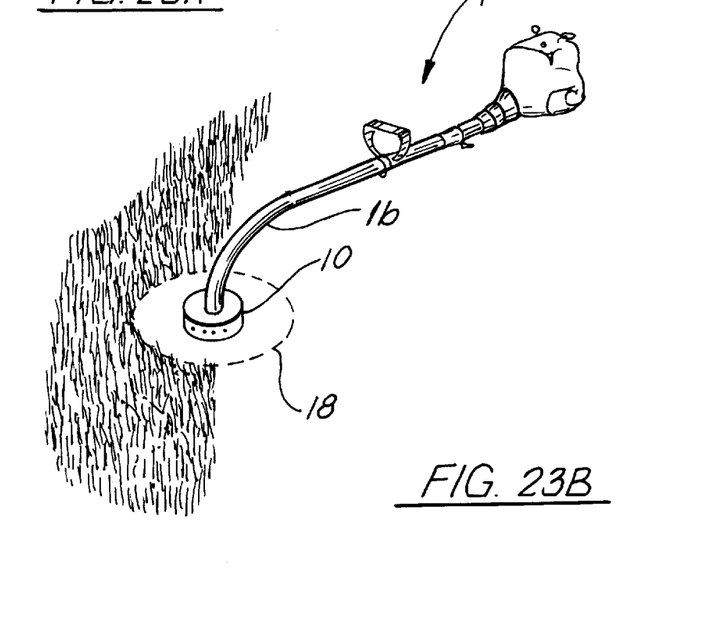

For an example of cutting weeds under ground, while protecting desirable plants, in the use of the exemplary cultivator embodiment 10 of the invention, note FIG. 23A. For an example of cutting grass as a line filament trimmer using filament line segments 18 placed in the hole sets 17, note FIG. 23B.

Figure 24A:
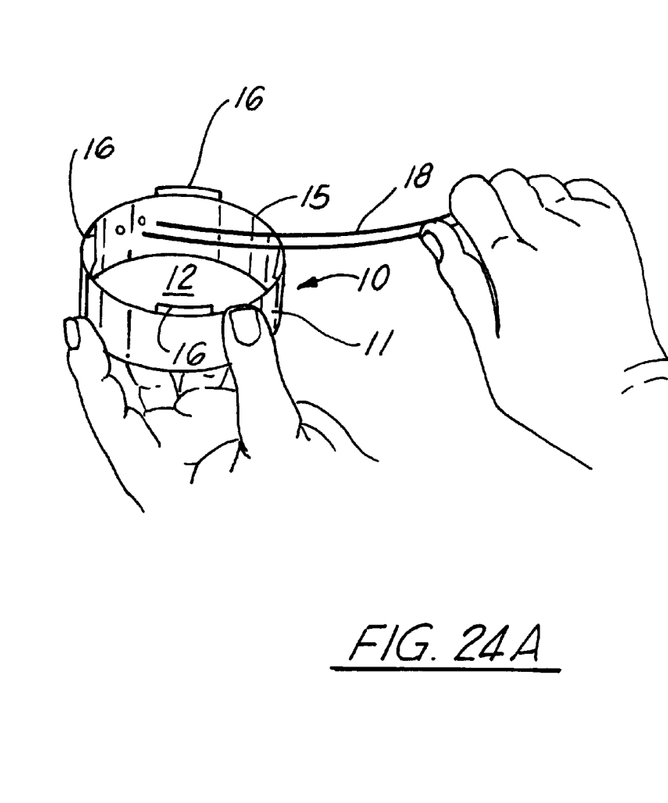
FIGS. 24A & B are perspective views showing the steps involved in adding a line filament segment to the body of the cultivator/cutter implement of FIGS. 1A–D.
Figure 24B:
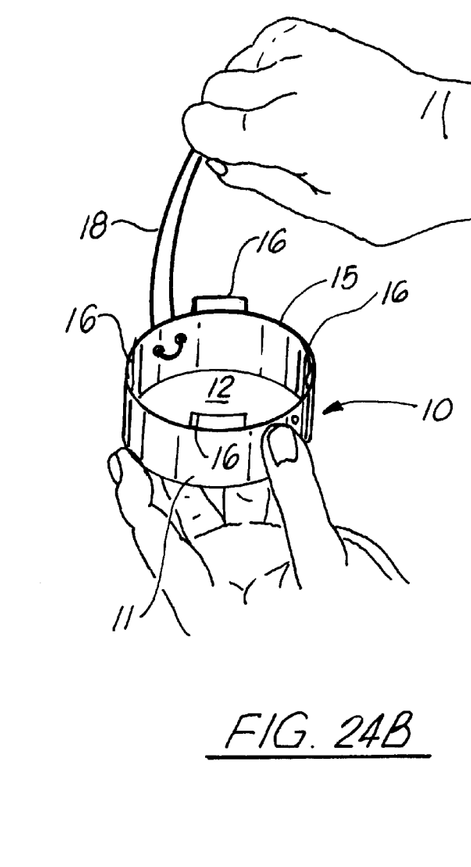

When it is time to initially add or replace the line filament segments 18, and with reference to FIG. 24A & B, the ends of each of the line segment 18 are inserted through each set of holes from the inside of the implement body as seen in FIG. 24A, with the ends then being pulled through from the outside until they are fully extended out of the body 11 of the implement 10, as seen in FIG. 24B.

It should be understood that the foregoing dimensions, materials, variations and alternatives, etc., are merely exemplary and many other changes are possible within the teachings of the present invention.

It is noted that the embodiments of the cultivator/cutter implement and the multi-implement systems described herein in detail for exemplary purposes are of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein generally are to be interpreted as illustrative and not in a limiting sense.

What is claimed is:

1. For use on a two-hand-held, powered device with a handle, the device having a powered, rotatable threaded member with a bottom end and having threads defining a diameter at its bottom end, a cultivator implement comprising:

an at least generally cylindrical body, having a hollow interior and an open bottom, a top, and a continuous, curved side wall having a diameter with an exterior surface and a circular bottom and a top wall portion; said top being affixed to said top wall portion of said side wall, substantially covering over said body, and having a central opening of a diameter smaller than the diameter of said side wall through which a threaded member can be extended of substantially the same size as the defined diameter of the threads of the powered rotatable member of the powered device; and a series of circumferentially spaced, castellated, cultivator protrusions affixed to and extending downwardly from said circular bottom of said body, said protrusions having exterior side walls inwardly offset less than an inch from the exterior surface of said side wall, said protrusions serving to cultivate the ground and macerate unwanted vegetation when the cultivator implement is rotated by the powered device and the cultivator implement is lowered bottom first into the ground or unwanted vegetation.

2. The cultivator implement of claim 1, wherein said cultivator protrusions are:

tapered.

3. The cultivator implement of claim 1, wherein: said body has a diameter of about three and three quarters (3¾") inches.

4. The cultivator implement of claim 1, wherein:

said cultivator protrusions, said body and said top of said body form an integral body of molded material.

5. The cultivator implement of claim 1, wherein there is further included:

multiple sets of circumferentially spaced opening pairs in said side wall, into which filament segments are placed, one segment for each opening pair, with the ends of each segment extending out past the exterior of said side wall, allowing the ends to be used as filament cutters when the cultivator implement is rotated by the powered device and the cultivator implement is lowered bottom first into vegetation or grass.

6. The cultivator implement of claim 1, wherein:

said top of said body includes a set of multiple, circumferentially spaced "snap-in" openings; and wherein there is further included:

a multiple number of additional, different implements, each of said implements including a series of upwardly directed extensions spaced from one another on each implement substantially the same as the spacing of said "snap-in" openings, said cultivator implement serving as a "universal" implement adapter.

7. The cultivated or implement of claim 1, wherein the handle is at least about four to six (4–6') feet in length.

8. The cultivator implement of claim 1, wherein the offset of said exterior side walls is less than about a quarter (¼") of an inch.

9. The cultivator implement of claim 1, wherein:

said cultivator protrusions each have a width of about an inch.

* * * * *